United States Patent
Koorapaty et al.

(10) Patent No.: US 9,526,081 B2
(45) Date of Patent: Dec. 20, 2016

(54) OVER-THE-AIR FREQUENCY AND TIME SYNCHRONIZATION FOR SMALL CELLS

(71) Applicant: Telefonaktiebolaget L M Ericsson (publ), Stockholm (SE)

(72) Inventors: Havish Koorapaty, Saratoga, CA (US); Daniel Larsson, Vallentuna (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 164 days.

(21) Appl. No.: 14/536,826

(22) Filed: Nov. 10, 2014

(65) Prior Publication Data

US 2015/0131607 A1    May 14, 2015

Related U.S. Application Data

(60) Provisional application No. 61/902,237, filed on Nov. 10, 2013.

(51) Int. Cl.
*H04J 3/06* (2006.01)
*H04B 15/00* (2006.01)
(Continued)

(52) U.S. Cl.
CPC ........ *H04W 56/0015* (2013.01); *H04L 5/0007* (2013.01); *H04W 56/0035* (2013.01);
(Continued)

(58) Field of Classification Search
CPC ............. H04L 5/0007; H04W 56/0015; H04W 56/0035; H04W 72/0426; H04W 72/085; H04W 88/08
(Continued)

(56) References Cited

U.S. PATENT DOCUMENTS 5,913,171 A * 6/1999 Solonen ............... H04B 7/2621
                                                    455/119
9,357,417 B2 * 5/2016 Siomina ............ H04W 36/0088
(Continued)

FOREIGN PATENT DOCUMENTS

WO         2015057156 A2      4/2015

OTHER PUBLICATIONS

International Search Report and Written Opinion for International Patent Application No. PCT/IB2014/065937, mailed Apr. 24, 2015, 15 pages.

*Primary Examiner* — Thai Hoang
(74) *Attorney, Agent, or Firm* — Withrow & Terranoca, PLLC

(57) ABSTRACT

Systems and methods related to time and frequency synchronization of a base station in a cellular communications network are disclosed. In some embodiments, a method of operation of a synchronizing base station comprises selecting a first base station for frequency synchronization and a second base station for time synchronization, where the second base station can be different than the first base station selected for frequency synchronization. The method further comprises performing frequency synchronization using a signal transmitted from a radio interface of the first base station and performing time synchronization using a signal transmitted from a radio interface of the second base station. In this manner, the synchronizing base station is enabled to independently select the first and second base stations used for frequency and time synchronization, respectively.

10 Claims, 12 Drawing Sheets

(51) Int. Cl.
  *H04W 56/00*   (2009.01)
  *H04L 5/00*    (2006.01)
  *H04W 72/04*   (2009.01)
  *H04W 72/08*   (2009.01)
  *H04W 88/08*   (2009.01)
(52) U.S. Cl.
  CPC ..... *H04W 72/0426* (2013.01); *H04W 72/085* (2013.01); *H04W 88/08* (2013.01)
(58) Field of Classification Search
  USPC ......... 370/342–347, 503–519; 455/13.2, 502
  See application file for complete search history.

(56) References Cited

U.S. PATENT DOCUMENTS

| | | | |
|---|---|---|---|
| 2003/0147426 A1* | 8/2003 | Cronin | H04B 7/2125 370/503 |
| 2005/0041692 A1* | 2/2005 | Kallstenius | H04J 3/0667 370/503 |
| 2007/0021130 A1* | 1/2007 | Taira | H04L 27/2613 455/502 |
| 2007/0076822 A1* | 4/2007 | Miller | H03D 13/003 375/327 |
| 2008/0159457 A1* | 7/2008 | Nelson | H04W 56/0035 375/356 |
| 2009/0247156 A1* | 10/2009 | Sampath | H04W 36/0083 455/434 |
| 2010/0054237 A1 | 3/2010 | Han et al. | |
| 2010/0260169 A1* | 10/2010 | Gheorghiu | H04W 56/0015 370/350 |
| 2011/0176483 A1 | 7/2011 | Palanki et al. | |
| 2012/0033620 A1* | 2/2012 | Thoen | H04J 3/0697 370/329 |
| 2012/0214524 A1* | 8/2012 | Wajcer | H04B 1/109 455/502 |
| 2012/0231807 A1 | 9/2012 | Kong et al. | |
| 2013/0121222 A1* | 5/2013 | Luo | H04W 36/20 370/311 |
| 2015/0131607 A1* | 5/2015 | Koorapaty | H04W 56/0015 370/330 |

\* cited by examiner

OVER-THE-AIR FREQUENCY AND TIME SYNCHRONIZATION FOR SMALL CELLS

RELATED APPLICATIONS

This application claims the benefit of provisional patent application Ser. No. 61/902,237, filed Nov. 10, 2013, the disclosure of which is hereby incorporated herein by reference in its entirety.

FIELD OF THE DISCLOSURE

This disclosure pertains to small-cell synchronization and, more particularly, to over-the-air frequency and time synchronization for small cells.

BACKGROUND

Third Generation Partnership Project (3GPP) Long Term Evolution (LTE) technology is a mobile broadband wireless communications technology in which transmissions from base stations (referred to as enhanced, or evolved, Node Bs (eNBs)) to mobile stations (referred to as User Equipments (UEs)) are sent using Orthogonal Frequency Division Multiplexing (OFDM). OFDM splits the signal into multiple parallel sub-carriers in frequency. The basic unit of transmission in LTE is a Resource Block (RB), which in its most common configuration consists of 12 subcarriers and seven OFDM symbols (one slot). A unit of one subcarrier and one OFDM symbol is referred to as a Resource Element (RE), as illustrated in FIG. 1. Thus, an RB consists of 84 REs. An LTE radio subframe is composed of two slots in time and multiple RBs in frequency with the number of RBs determining the bandwidth of the system, as illustrated in FIG. 2. Furthermore, the two RBs in a subframe that are adjacent in time are denoted as an RB pair. Currently, LTE supports standard bandwidth sizes of 6, 15, 25, 50, 75, and 100 RB pairs. In the time domain, LTE downlink transmissions are organized into radio frames of 10 milliseconds (ms), each radio frame consisting of ten equally-sized subframes of length $T_{subframe}=1$ ms.

The signal transmitted by the eNB in a downlink (the link carrying transmissions from the eNB to the UE) subframe may be transmitted from multiple antennas and the signal may be received at a UE that has multiple antennas. The radio channel distorts the transmitted signals from the multiple antenna ports. In order to demodulate any transmissions on the downlink, a UE relies on Reference Symbols (RSs) that are transmitted on the downlink. These RSs and their position in the time-frequency grid are known to the UE and hence can be used to determine channel estimates by measuring the effect of the radio channel on these symbols. In LTE Release 11 and prior releases of LTE, there are multiple types of RSs. Common Reference Symbols (CRSs) are used for channel estimation during demodulation of control and data messages in addition to synchronization. The CRSs occur once every subframe.

Heterogeneous, or multi-layer, deployments of LTE networks (referred to as heterogeneous networks) can be used to, e.g., increase capacity and achievable data rates in areas where needed. A heterogeneous network includes a macro cell layer including a number of macro cells served by corresponding eNBs (sometimes referred to as macro eNBs or macro cell eNBs) and a small cell layer including a number of small cells served by corresponding small or small cell eNBs (e.g., Homes eNBs (HeNBs), pico eNBs, micro eNBs, femto eNBs, etc.). The macro eNBs serving the macro cells and the small eNBs serving the small cells have vastly different transmit powers and may be deployed in two main ways. In the first deployment type, the small cell layer and the macro cell layer share the same carrier frequencies, which creates interference between the two layers. In the second deployment type, the small cell layer and the macro cell layer are on separate frequencies.

Many features of LTE technology benefit from the eNBs in the system being synchronized with each other with respect to transmit timing and frequency. Synchronization of eNBs is typically done using a Global Navigation Satellite System (GNSS), such as Global Positioning System (GPS), or by using network based methods such as IEEE 1588v2. However, such methods may not be available to all eNBs, particularly small cell eNBs in a heterogeneous network. As such, there is a need for systems and methods for transmit timing and frequency synchronization for small cell eNBs in a heterogeneous network.

SUMMARY

Systems and methods related to time and frequency synchronization of a base station in a cellular communications network are disclosed. In some embodiments, a method of operation of a synchronizing base station comprises selecting a first base station for frequency synchronization and a second base station for time synchronization, where the second base station can be different than the first base station selected for frequency synchronization. The method further comprises performing frequency synchronization using a signal transmitted from a radio interface of the first base station and performing time synchronization using a signal transmitted from a radio interface of the second base station. In this manner, the synchronizing base station is enabled to independently select the first and second base stations used for frequency and time synchronization, respectively.

In some embodiments, the cellular communications network comprises a first layer of base stations comprising a plurality of first layer base stations and a second layer of base stations comprising a plurality of second layer base stations. The first base station selected for frequency synchronization is either in the first layer of base stations or the second layer of base stations, the second base station selected for time synchronization is either in the first layer of base stations or the second layer of base stations, and the synchronizing base station is in the second layer of base stations.

Further, in some embodiments, selecting the first base station for frequency synchronization and the second base station for time synchronization comprises determining whether a first layer base station having a received signal quality at the synchronizing base station that is greater than a first threshold is available in the first layer of base stations. If a first layer base station having a received signal quality at the synchronizing base station that is greater than the first threshold is available in the first layer of base stations, the first layer base station is selected as the first base station for frequency synchronization. Otherwise, if a first layer base station having a received signal quality at the synchronizing base station that is greater than the first threshold is not available in the first layer of base stations, another second layer base station in the second layer of base stations is selected as both the first base station for frequency synchronization and the second base station for time synchronization.

Further, in some embodiments, if a first layer base station having a received signal quality at the synchronizing base station that is greater than the first threshold is available in the first layer of base stations, selecting the first base station for frequency synchronization and the second base station for time synchronization further comprises obtaining a synchronization status of the first layer base station. The synchronization status of the first layer base station is indicative of whether the first layer base station is synchronized with other first layer base stations in the first layer of base stations. Selecting the first base station for frequency synchronization and the second base station for time synchronization further comprises determining whether: (a) the received signal quality for the first layer base station at the synchronizing base station is greater than a second threshold that is greater than the first threshold and (b) either the first layer base station is synchronized with other first layer base stations as indicated by the synchronization status of the first layer base station or time offset information for the first layer base station is available. The time offset information is indicative of a time offset between transmit timing of the first layer base station and a reference timing. The first layer base station is selected as the second base station for time synchronization if the received signal quality for the first layer base station at the synchronizing base station is greater than the second threshold and either the first layer base station is synchronized with other first layer base stations or time offset information for the first layer base station is available. Otherwise, another second layer base station is selected as the second base station for time synchronization.

In other embodiments, if a first layer base station having a received signal quality at the synchronizing base station that is greater than the first threshold is available, selecting the first base station for frequency synchronization and the second base station for time synchronization further comprises obtaining a synchronization status of the first layer base station. The synchronization status being indicative of whether the first layer base station is synchronized with other first layer base stations. Selecting the first base station for frequency synchronization and the second base station for time synchronization further comprises determining whether: (a) the received signal quality for the first layer base station at the synchronizing base station is greater than a second threshold that is greater than the first threshold and (b) either the first layer base station is synchronized with other first layer base stations as indicated by the synchronization status of the first layer base station or time offset information for the first layer base station is available. The time offset information is indicative of a time offset between transmit timing of the first layer base station and a reference timing. Another second layer base station is selected as the second base station for time synchronization if the received signal quality for the first layer base station at the synchronizing base station is not greater than the second threshold or the first layer base station is not synchronized with other first layer base stations and time offset information for the first layer base station is not available. Otherwise, selecting the first base station for frequency synchronization and the second base station for time synchronization further comprises determining whether a difference between (a) a received signal quality at the synchronizing base station for another second layer base station having a best received signal quality at the synchronizing base station and (b) a received signal quality level at the synchronizing base station for the first layer base station is greater than a predefined difference threshold. If the difference is greater than the predefined difference threshold, the other second layer base station is selected as the second base station for time synchronization. Conversely, if the difference is not greater than the predefined difference threshold, the first layer base station is selected as the second base station for time synchronization.

In some embodiments, selecting the first base station for frequency synchronization and the second base station for time synchronization comprises selecting a base station with a best received signal quality at the synchronizing base station from among the first layer of base stations and the second layer of base stations as the first base station for frequency synchronization. Selecting the first base station for frequency synchronization and the second base station for time synchronization further comprises obtaining a synchronization status of each of a plurality of base stations having the N best received signal qualities at the synchronizing base station from among the first layer of base stations and the second layer of base stations, where N>1. One of the plurality of base stations having the N best received signal qualities at the synchronizing base station is selected as the second base station for time synchronization based on the synchronization statuses of the plurality of base stations having the N best received signal qualities at the synchronizing base station.

Further, in some embodiments, selecting the one of the plurality of base stations having the N best received signal qualities at the synchronizing base station comprises selecting a base station having a lowest expected timing error from among those of the plurality of base stations having the N best received signal qualities at the synchronizing base station that are either synchronized or have available time offsets relative to a reference timing.

Further, in some embodiments, an expected timing error for each base station of the plurality of base stations having the N best received signal qualities at the synchronizing base station is determined based on the received signal quality at the synchronizing base station for the base station and a stratum number that defines a number of hops between the base station and a reference base station.

In some embodiments, performing time synchronization using the signal transmitted from the radio interface of the second base station comprises obtaining a timing offset, $\delta_i$, for the second base station with respect to a reference timing, measuring a timing of the second base station to provide a timing, $t_i$, of the second base station measured at the synchronizing base station, and computing a timing of the synchronizing base station based on the timing, $t_i$, of the second base station measured at the synchronizing base station and the timing offset, $\delta_i$, for the second base station with respect to the reference timing.

Embodiments of a synchronizing base station are also disclosed. In some embodiments, the synchronizing base station comprises a radio unit, at least one processor, and memory containing software executable by the at least one processor whereby the synchronizing base station is configured to operate according to any of the embodiments of the method of operation of the synchronizing base station disclosed herein.

Embodiments of a method of operation of a network node to enable time and frequency synchronization of base stations are also disclosed. In some embodiments, the method of operation of the network node comprises obtaining a time offset between a transmit timing of a first base station and a reference timing, obtaining a time offset between a transmit timing of a second base station and the transmit timing of the first base station, and computing a time offset between the transmit timing of the second base station and the reference timing based on the time offset between the transmit timing of the first base station and the reference timing and the time offset between the transmit timing of the second base station and the transmit timing of the first base station. In some embodiments, the method of operation of the network node further comprises providing the time offset between the transmit timing of the second base station and the reference timing to another base station for assistance in time synchronization of the other base station.

In some embodiments, the second base station is a base station for which the network node does not have a direct measurement of the time offset between the transmit timing of the second base station and the reference timing.

In some embodiments, the other base station does not have Global Navigation Satellite System (GNSS) capability.

In some embodiments, the other base station is part of a cluster of small cell base stations having synchronized transmit timing.

In some embodiments, the base stations are part of a cellular network comprising a first layer of base stations that comprise a plurality of first layer base stations and a second layer of base stations that comprise a plurality of second layer base stations, wherein the method further comprises configuring the plurality of second layer base stations to report transmit timing offset measurements indicative of transmit timing offsets between first layer base stations detected by the plurality of second layer base stations.

In some embodiments, the base stations are part of a cellular network comprising a first layer of base stations that comprise a plurality of first layer base stations and a second layer of base stations that comprise a plurality of second layer base stations, wherein the method further comprises configuring the plurality of second layer base stations to report transmit timing offset measurements indicative of transmit timing offsets between first layer base stations detected by the plurality of second layer base stations periodically at a periodicity determined by drift rates of oscillators in the first layer base stations.

In some embodiments, a network node enabling transmit timing synchronization for base stations is provided wherein the network node comprises at least one processor and memory containing software executable by the at least one processor whereby the network node is operative to operate according to any the embodiments of the method of operation of a network node disclosed herein.

Embodiments of a method of operation of a base station to measure and report a transmit timing offset for one or more pairs of base stations detected by the base station are also disclosed. In some embodiments, the method of operation of the base station comprises measuring a transmit timing of a first base station, measuring a transmit timing of a second base station, and computing a time offset between the transmit timing of the first base station and one of a group consisting of: the transmit timing of the second base station and a reference timing as determined by the transmit timing of the second base station and a known difference between the transmit timing of the second base station and the reference timing. In some embodiments, the method of operation of the base station further comprises reporting the time offset to a network node.

In some embodiments, the method of operation of the base station further comprises periodically repeating the steps of measuring the transmit timing of the first base station, measuring the transmitting timing of the second base station, computing the time offset between the transmit timing of the first base station and the transmit timing of the second base station, and reporting the time offset to the network node.

In some embodiments, periodically repeating the steps comprises periodically repeating the steps at a periodicity determined by drift rates of oscillators in the first and second base stations.

Embodiments of a base station enabled to report transmit timing offsets of other base stations to a network node are also disclosed. In some embodiments, the base station comprises a radio unit, a network interface, at least one processor, and memory containing software executable by the at least one processor whereby the base station is operative to operate according to any of the embodiments for measuring and reporting offsets disclosed herein.

Those skilled in the art will appreciate the scope of the present disclosure and realize additional aspects thereof after reading the following detailed description of the embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
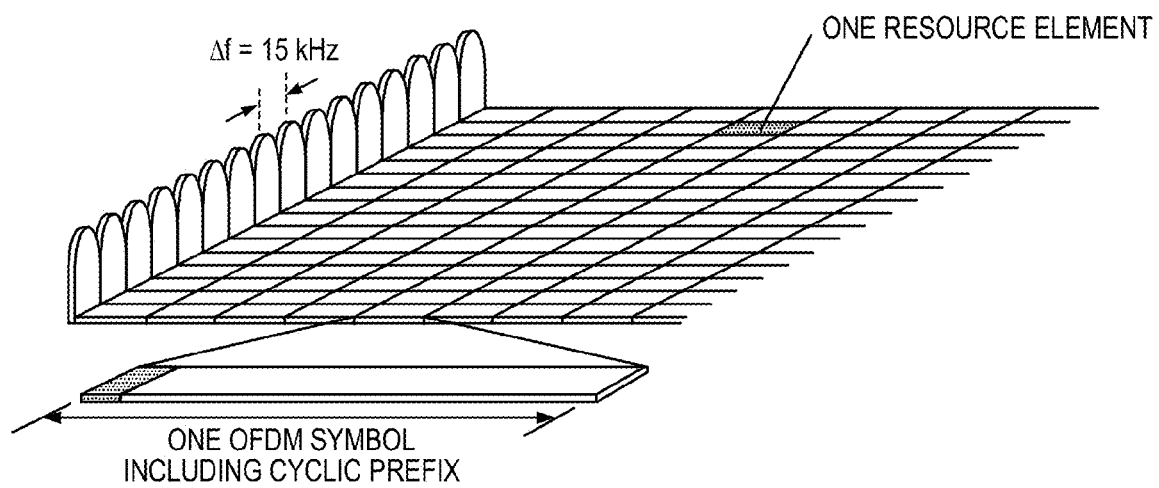
FIG. 1 illustrates a Resource Element (RE) in a Third Generation Partnership Program (3GPP) Long Term Evolution (LTE) Resource Block (RB)
Figure 2:
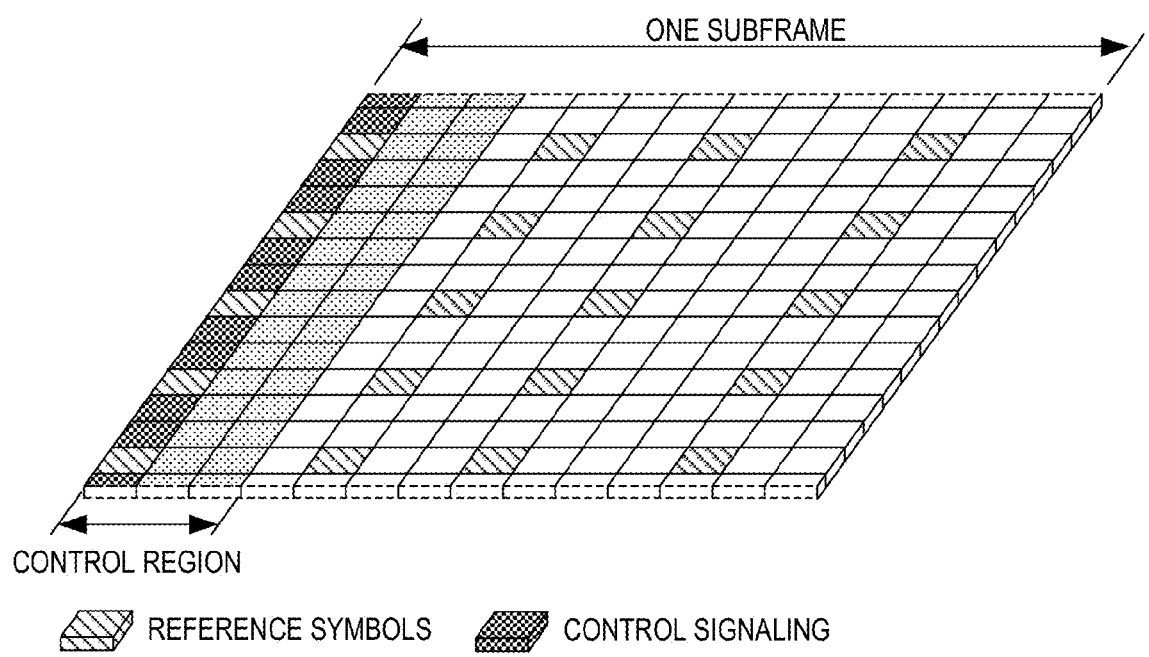
FIG. 2 illustrates a 3GPP LTE radio subframe.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Many features of Third Generation Partnership Project (3GPP) Long Term Evolution (LTE) technology benefit from the enhanced, or evolved, Node Bs (eNBs) in the system being synchronized with each other with respect to transmit timing and frequency. Synchronization of eNBs is typically done using a Global Navigation Satellite System (GNSS), such as Global Positioning System (GPS), or by using network based methods such as IEEE 1588v2. However, when such methods are unavailable to an eNB, it may be possible to use LTE reference signals transmitted by other eNBs to acquire synchronization. Such techniques are currently being discussed in 3GPP for small cells in LTE Release 12 where a small cell can obtain synchronization from a macro cell or from other small cells.

One of the scenarios being considered by 3GPP is the case where the macro cell layer is not synchronized, i.e., the timing of the macro cells is not aligned, whereas it is desired that the small cell layer in the coverage of the macro layer is synchronized. When small cells in a cluster of small cells on the border of two macro cells use a macro cell to obtain synchronization, it may be possible that the small cells in the cluster synchronize to different macro cells. When this happens, small cells in the same cluster may not be time-synchronized with each other since the different macro cells that were used as the synchronization source are not synchronized between themselves. In order to solve this problem, when only one or some of the small cells in a cluster of small cells has GNSS capability, a small cell without GNSS capability may obtain synchronization from another small cell that either has GNSS capability or has obtained synchronization from yet another small cell with GNSS capability. The problem that occurs with this approach is that the received Signal-to-Interference plus Noise Ratio (SINR) when receiving signals from other small cells in this manner can be poor. It may be enough to obtain time synchronization if reliable frequency synchronization is already available from another source. However, if frequency and time synchronization need to be obtained via the radio signals received from other small cells, the SINR is not adequate. To alleviate this, some cells can mute their transmissions to improve SINR. However, this may not be sufficient in all cases and can still preclude some small cells in the network from obtaining reliable synchronization.

One solution to the problem of synchronizing the small cell layer when the macro cell layer is not synchronized is to limit the number of small cells in a cluster that can synchronize to a macro cell to one and then to let all the other small cells synchronize to this master cell either directly or via other small cells that have synchronized to this master cell. This can ensure that cells in the small cell cluster do not synchronize to different macro cells. However, the problem with this solution is that a small cell eNB may be separated in the synchronization hierarchy from the master small cell eNB in the cluster by many hops. For example, a small cell eNB may synchronize to another small cell eNB which has in turn synchronized to another small cell eNB which has synchronized to the master small cell eNB. The number of hops in this case is three. When the number of hops increases, the estimation errors in each hop may accumulate so that the synchronization accuracy for the eNB with a high hop number may be compromised. This is true when both frequency and time synchronization need to be obtained.

Another solution to the problem of synchronizing the small cell layer when the macro cell layer is not synchronized is to ensure that every small cell eNB has a GNSS receiver and/or is connected to a backhaul that is good enough to support network based synchronization. This solution can, however, lead to greater cost and also may not be feasible in some cases where satellite coverage or a good backhaul connection is not possible.

Yet another solution to the problem of synchronizing the small cell layer when the macro cell layer is not synchronized is to use a small cell eNB that can receive signals from multiple macro cell eNBs with adequate SINR to measure the timing offset between the transmit timing for each of the macro cell eNBs and a reference timing which may coincide with the transmit timing of one of the macro cell eNBs or with a GNSS reference timing. These offsets can then be communicated to the other small cell eNBs which may be able to see only one or fewer macro cell eNBs but can still use the offsets to obtain time synchronization with the other small cells. This solution may not work in some circumstances where signals from a particular macro cell eNB cannot be reliably received by a small cell eNB that can also receive signals from other macro cell eNBs. For example, if there are two small cell eNBs and two macro cell eNBs and each small cell eNB can only receive signals from one of the macro cell eNBs, then this solution does not work. Also, if a particular small cell eNB cannot reliably receive signals from the macro cell eNB being used as the reference, then this solution may not work.

The aforementioned solution is described in [a commonly owned and assigned Patent Cooperation Treaty (PCT) application serial number PCT/SE2014/051230, entitled OVER-THE-AIR SYNCHRONIZATION FOR SMALL CELLS, filed Oct. 18, 2014]. Again, in this solution, offsets can be measured for all macro cells for which signals can be received by a small cell along with the reference macro cell with a high enough SINR. When this is not the case, it may not be possible to use the macro cell as a reference. Then the small cell may be forced to use other small cells which can again lead to poor SINR and can preclude some small cells in the network from obtaining reliable synchronization.

Systems and methods are disclosed herein that enable synchronization of a small cell layer of a heterogeneous network that address the problems associated with the solutions of small cell layer synchronization discussed above. The systems and methods disclosed herein work both when the macro cell layer is synchronized (i.e., when the macro cell eNBs are synchronized between themselves) and when the macro cell layer is not synchronized.

In particular, the systems and methods disclosed herein solve the problem of poor SINR and unreliable small cell synchronization. The systems and methods disclosed herein solve these problems by utilizing synchronization procedures that work both when the macro eNBs are synchronized between themselves and when they are not. Specifically, two different synchronization procedures are disclosed. The first is independently or separately selecting the eNB source for time synchronization and the eNB source for frequency synchronization depending on the synchronization status of the macro eNBs. The second is the ability to compute time offsets for macro cells that are not received with reasonable SINR along with the reference macro eNB.

Some embodiments allow the use of different eNBs for time and for frequency synchronization. Frequency synchronization may always be obtained from a macro eNB or the eNB received with the highest SINR that is already in a synchronized state if a macro eNB with sufficient SINR is not available. The eNB for time synchronization may then be separately chosen based on the synchronization status of the macro eNB and on the availability of offset information from the eNB.

Some embodiments enable the use of macro cells for providing reference timing via the computation of an appropriate timing offset with respect to the timing of another macro cell even when signals from the two macro cells are not received reliably by any small cell in the network. This is done by combining the offsets measured by a set of small cells.

Advantages apparent from the embodiments of the present disclosure include providing the ability for operators to synchronize small cell eNBs even when the macro cells in the same coverage region are not synchronized. The robustness of small cell synchronization may also be improved.

Figure 3:
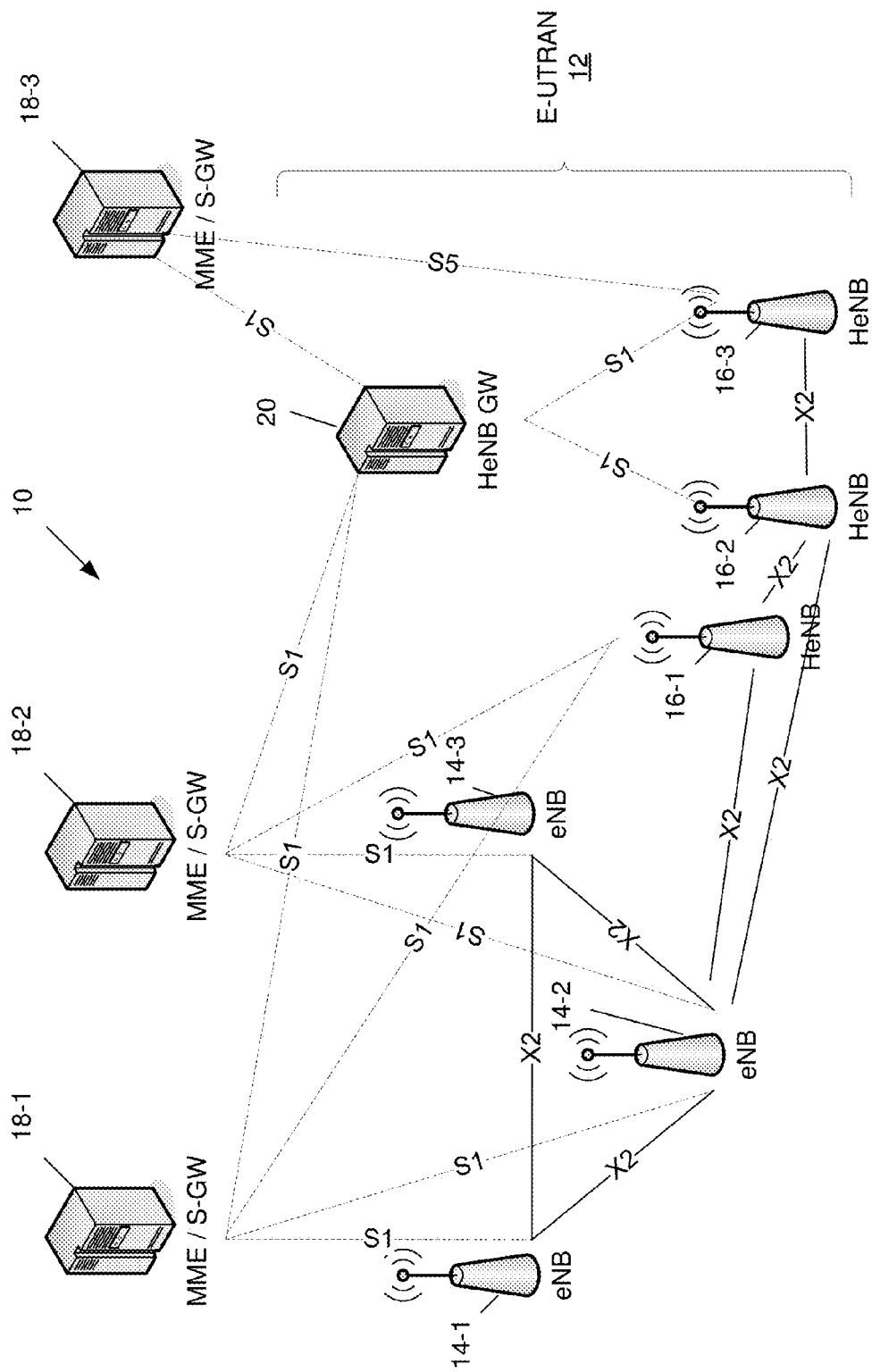
FIG. 3 illustrates one example of a heterogeneous deployment of an LTE network that enables time and frequency synchronization of small cells according to some embodiments of the present disclosure.

FIG. 3 illustrates one example of a heterogeneous deployment of an LTE network 10 according to some embodiments of the present disclosure. Note that the discussion herein focuses on LTE and, therefore, LTE terminology (e.g., eNB) is oftentimes used. However, the embodiments disclosed herein are not limited to LTE and may be used in any type of heterogeneous or multi-layer network. As such, LTE terminology may sometimes be generalized to encompass both LTE networks and other types of networks. For example, the term eNB may be generalized to base station or radio access node.

Before proceeding, it should be noted that while the embodiments described herein focus on a heterogeneous network having both macro cell eNBs and small cell eNBs, the present disclosure is not limited thereto. The embodiments disclosed herein can be applied to any multi-layer network having at least two layers of radio access nodes (e.g., at least two layers of base stations such as eNBs), where at least some of the radio access nodes obtain synchronization from radio access node(s) in the same layer or a different layer. In some embodiments, the radio access nodes in the at least two layers have different frequency bands of operation and overlapping coverage. These layers having different frequency bands of operation may be referred to as different frequency layers. Thus, while terminology such as macro eNBs, small cell eNBs, home eNBs, etc. are used in the description below, it should be appreciated that these are only examples and that the embodiments disclosed herein are equally applicable to any type of multi-layer network (i.e., any network having multiple layers of radio access nodes or base stations). For instance, a network may include two layers, namely, a first layer and a second layer, where radio access nodes (e.g., base stations) in the second layer utilize signals transmitted from radio access nodes in the first layer for time and frequency synchronization according to any of the embodiments described herein. In this regard, in one particular example, the first layer includes macro eNBs and the second layer includes small eNBs (e.g., home eNBs), but, again, the first and second layers are not limited thereto.

As illustrated in FIG. 3, the LTE network 10 includes an Evolved Universal Terrestrial Radio Access Network (E-UTRAN) 12. The E-UTRAN 12 includes a macro cell layer, which includes a number of macro cell eNBs 14-1, 14-2, and 14-3 (generally referred to herein collectively as macro cell eNBs 14 and individually as macro cell eNB 14), and a small cell layer, which in this example includes a number of Home eNBs (HeNBs) 16-1, 16-2, and 16-3 (generally referred to herein collectively as HeNBs 16 and individually as HeNB 16). Note that while the HeNBs 16 are illustrated in this example, the small cell layer may include any type(s) of small cell eNBs (e.g., HeNBs, micro eNBs, pico eNBs, femto eNBs, etc.), where each type of small cell eNB may vary in, e.g., transmit power level and thus cell size. The eNBs 14 are sometimes referred to herein as macro eNBs 14 or macro cell eNBs 14. The HeNBs 16 are sometimes referred to herein as small cell eNBs 16 or small eNBs 16. The eNBs 14 and 16 communicate via corresponding X2 interfaces.

As used herein, a macro eNB 14 (or equivalently a macro base station or macro radio access node) has a maximum transmit power, and thus cell size, that is significantly greater than the maximum transmit power, and thus cell size, of a small eNB 16 (or equivalently a small base station or small radio access node). In contrast, a HeNB 16 (or small base station or small radio access node) has a maximum transmit power, and thus cell size, that is significantly less than that of a macro eNB 14. For example, a macro eNB 14 may be defined as an eNB having a maximum output power of 43 decibel-milliwatts (dBm), whereas a small cell eNB 16 may be defined as an eNB having a maximum output power of 38 dBm (for a micro cell eNB), 24 dBm (for a pico cell eNB), or 20 dBm (for a HeNB 16).

The eNBs 14 and 16 are connected to a core network via corresponding S1 and/or S5 interfaces. In particular, in this example, the macro eNBs 14 are connected to corresponding Mobility Management Entities (MMEs) and Serving Gateways (S-GWs) 18-1 and 18-2 via S1 interfaces, the HeNB 16-1 is connected to the MMEs and S-GWs 18-1 and 18-2 via corresponding S1 interfaces, and the HeNB 16-3 is connected to MME and S-GW 18-3 via an S5 interface. The MMEs and S-GWs 18-1, 18-2, and 18-3 are generally referred to herein collectively as MMEs and S-GWs 18 and individually as MME and S-GW 18. In this example, the HeNBs 16-2 and 16-3 are connected to the core network via a HeNB Gateway (GW) 20.

As discussed above, the macro cell layer (i.e., the macro cell eNBs 14) may or may not be synchronized. In particular, the macro cell eNBs 14 may or may not be synchronized to one other. In this example, the HeNBs 16 form a cluster of HeNBs (or in other words a cluster of small cells) that are to be synchronized. Embodiments are disclosed herein for enabling time and frequency synchronization of the cluster of HeNBs 16.

In general, a case is considered where a small cell (e.g., a small cell served by one of the HeNBs 16) needs to derive both time and frequency synchronization from signals received on the radio interface of the corresponding small eNB. In some embodiments, the small cell uses different eNBs (e.g., different macro cell eNBs 14 or different macro and small cell eNBs 14 and 16) for time and frequency synchronization when doing so is beneficial. This is done to make use of the fact that frequency synchronization and time synchronization may have different SINR requirements as well as different constraints. For example, frequency synchronization is not affected by the distance between different eNBs, which influences the propagation delay. Frequency synchronization is only affected by the received SINR, whereas time synchronization is affected by the propagation delay.

Figure 4:
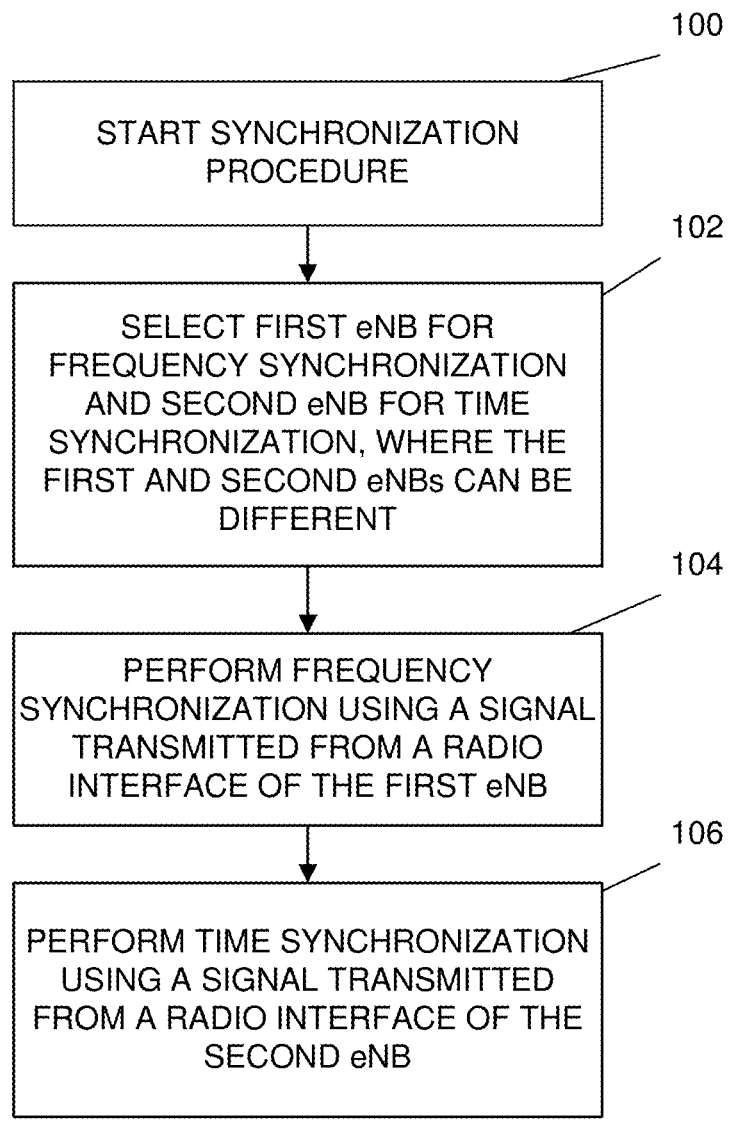
FIG. 4 is a flow chart that illustrates the operation of one of the Home enhanced, or evolved, Node Bs (HeNBs) of FIG. 3 to perform a time and frequency synchronization procedure according to some embodiments of the present disclosure.

In this regard, FIG. 4 is a flow chart that illustrates the operation of one of the HeNBs 16 to perform time and frequency synchronization according to some embodiments of the present disclosure. Note that while this process is described with respect to the HeNB 16, this discussion is equally applicable to any type of small cell base station. Further, while a number of "steps" are illustrated in FIG. 4 and other figures described herein, it should be understood that the "steps" in any particular process may be performed in any desired order unless otherwise explicitly stated or required, and some steps may be performed in parallel. As illustrated, the HeNB 16 starts a synchronization procedure (step 100). The HeNB 16 may start the synchronization procedure in response to any suitable trigger such as, for example, being powered on or configured to start operation. The HeNB 16 selects a first eNB 14, 16 for frequency synchronization and a second eNB 14, 16 for time synchronization (step 102). Importantly, the first eNB 14, 16 selected for frequency synchronization and the second eNB 14, 16 selected for time synchronization may be different eNBs 14, 16, as discussed below in detail. For example, since frequency and time synchronization may have different SINR requirements and different constraints (e.g., the constraint on distance between the HeNB 16 and the eNB 14, 16 selected for time synchronization may be different than the constraint on distance between the HeNB 16 and the eNB 14, 16 selected for frequency synchronization), these different requirements and constraints can be used to independently select the eNB(s) 14, 16 used for time and frequency synchronization.

The HeNB 16 performs frequency synchronization for the small cell served by the HeNB 16 using a signal transmitted from a radio interface of the first eNB 14, 16 selected for frequency synchronization (step 104). Frequency synchronization may be performed using any suitable frequency synchronization process. This may include the use of a correlation based frequency estimator that hypothesizes different frequency offsets and generates a signal corresponding to each hypothesis to correlate against the received signal. A metric is computed for each hypothesis based on the correlator output and the hypothesis with the best output is chosen. Filtering and tracking techniques may also be used in addition. Similarly, the HeNB 16 performs time synchronization for the small cell served by the HeNB 16 using a signal transmitted from a radio interface of the second eNB 14, 16 selected for time synchronization (step 106). Time synchronization may be performed using any suitable time synchronization process. For example, a correlation based approach as described may be used.

Figure 5:
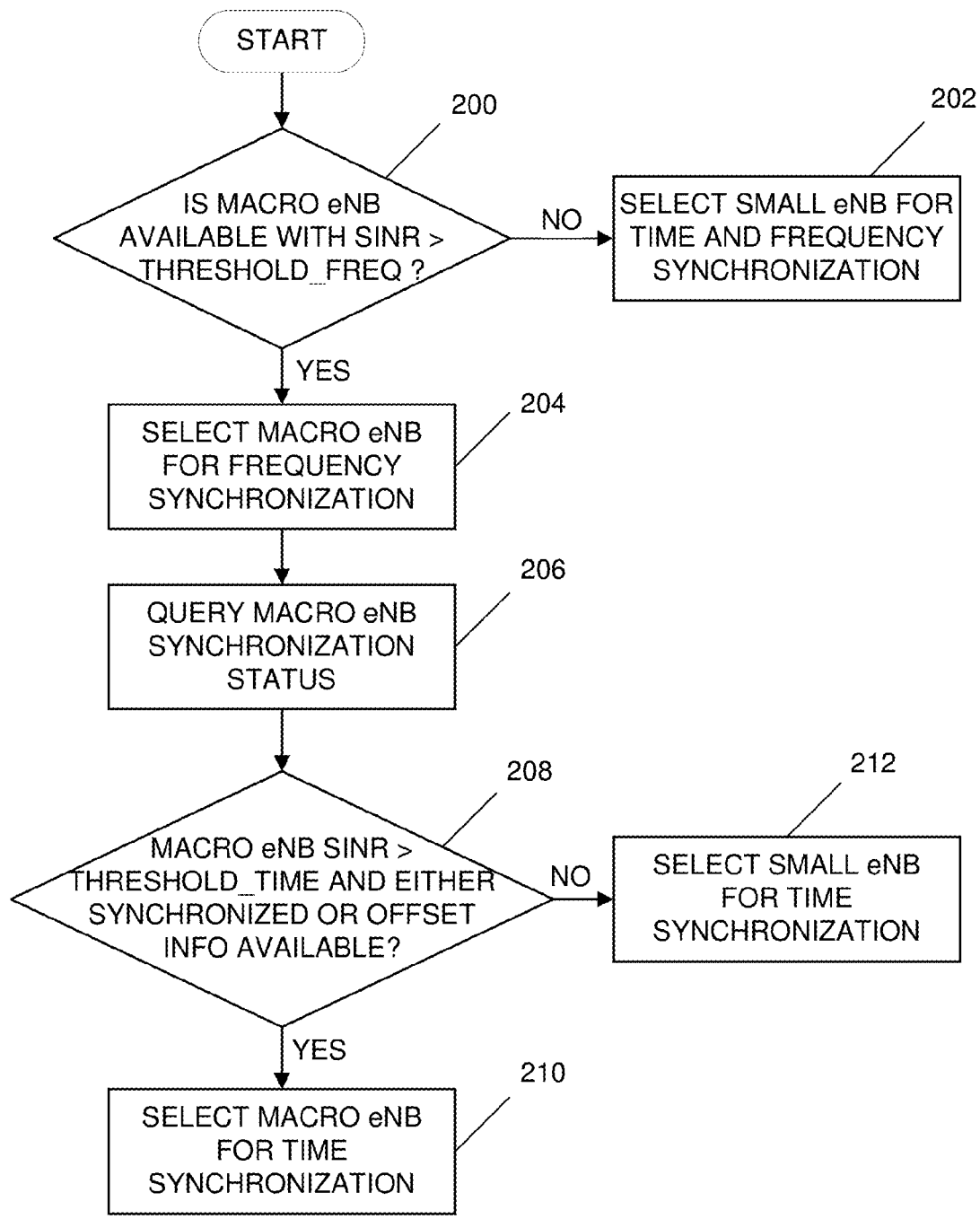
FIG. 5 is a flow chart that illustrates the selection step of FIG. 4 in more detail according to one embodiment of the present disclosure.
Figure 6A:
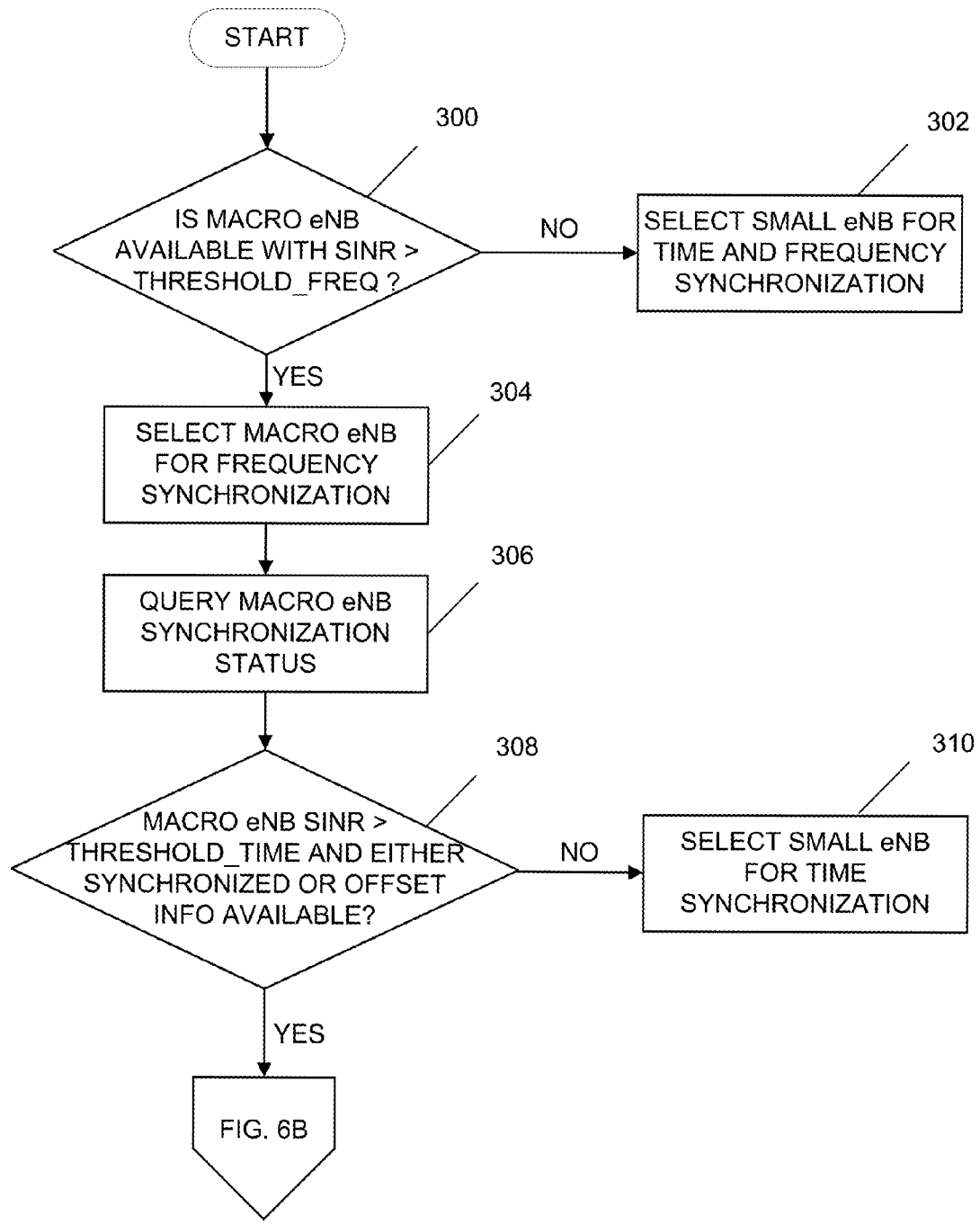
FIGS. 6A and 6B are a flow chart that illustrates the selection step of FIG. 4 in more detail according to another embodiment of the present disclosure.
Figure 6B:
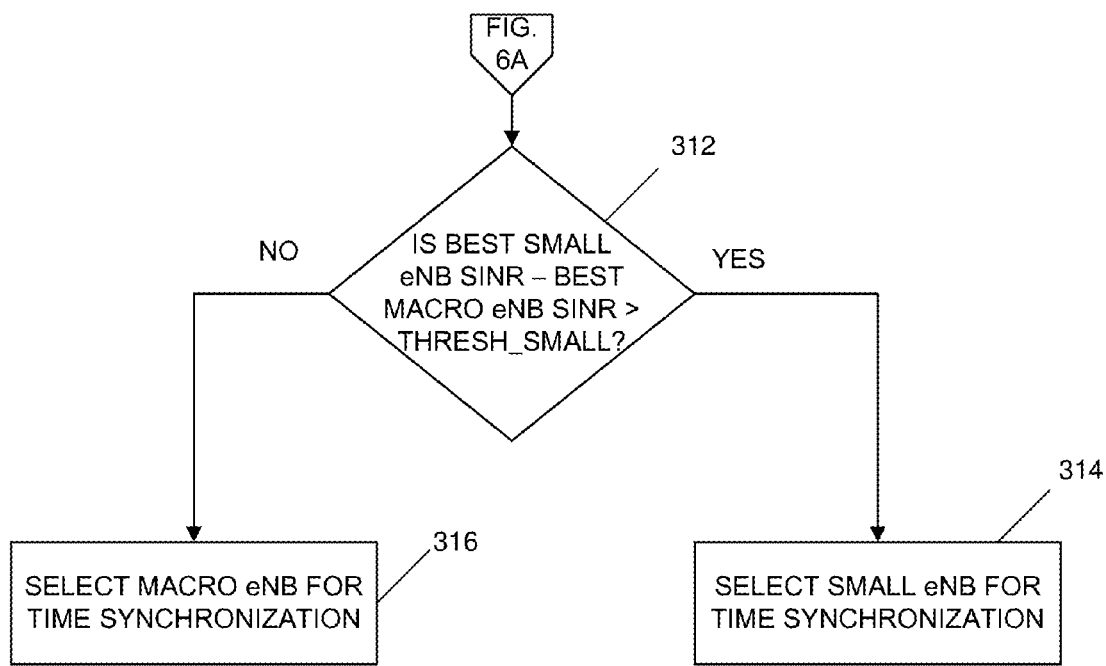
Figure 7:
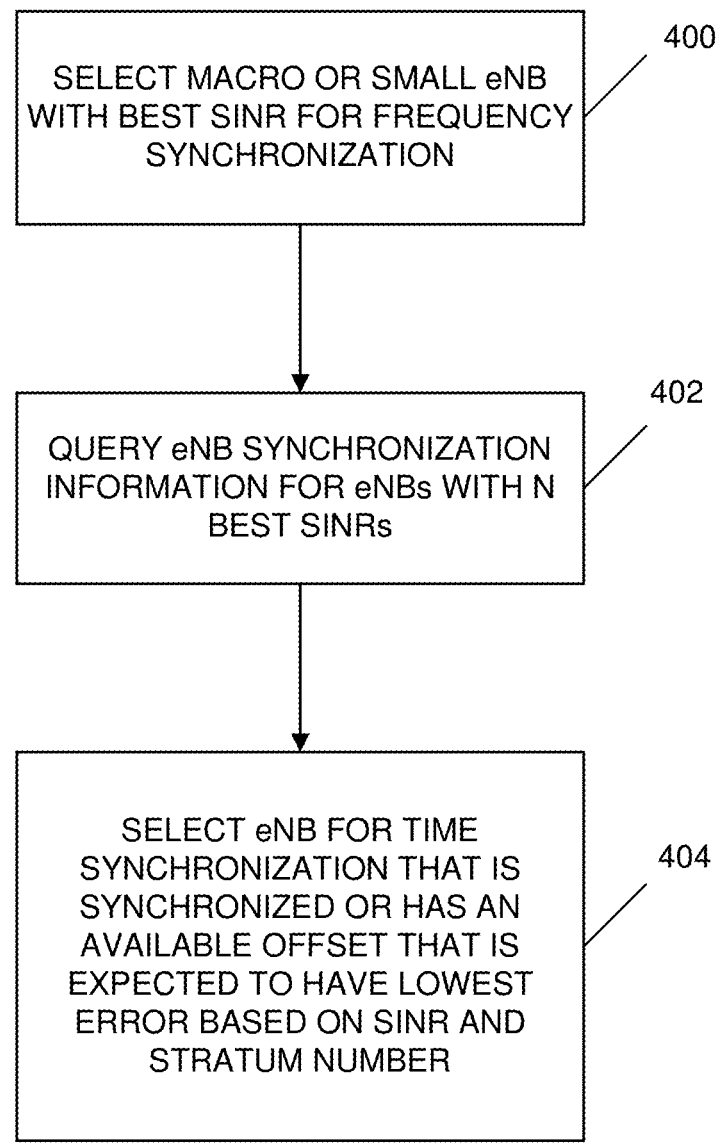
FIG. 7 is a flow chart that illustrates the selection step of FIG. 4 in more detail according to yet another embodiment of the present disclosure.

FIGS. 5 through 7 illustrate step 102 of FIG. 3 in more detail according to some embodiments of the present disclosure. In particular, FIG. 5 and FIGS. 6A and 6B illustrate embodiments in which a HeNB 16 can distinguish the macro eNBs 14 from other HeNBs 16 (i.e., the small cell eNBs) by the signals that the HeNB 16 receives from the macro eNBs 14 and the other HeNBs 16. For example, this may be the case when the macro cells in the macro cell layer are operating on a different frequency band than the small cells in the small cell layer and this is known to the HeNBs 16. In contrast, FIG. 7 illustrates an embodiment in which the macro eNBs 14 cannot easily be (or do not need to be) distinguished from the HeNBs 16. For example, this may be the case when the macro cell layer is operating on the same frequency band as the small cell layer.

FIG. 5 illustrates step 102 of FIG. 4 in more detail according to some embodiments of the present disclosure. As discussed above, for these embodiments, the HeNB 16 performing synchronization is able to distinguish the macro cell eNBs 14 from other HeNBs 16. For frequency synchronization, the key task is to find a reference for the clock of the HeNB 16 clock from which transmit frequencies for multiple bands may be derived. The HeNB 16 may derive synchronization of the clock from signals received on the same band as downlink transmissions on the small cell or from a different frequency band, e.g., the one used by the macro eNBs 14 in implementations where the macro eNBs 14 use a different frequency band than the HeNBs 16.

In this embodiment, the HeNB 16 serving the small cell that needs to be synchronized first tries to obtain frequency synchronization from the macro cell layer. In this particular embodiment, the HeNB 16 serving the small cell that needs to be synchronized determines whether a macro eNB 14 is available with a SINR that is greater than a predefined threshold for frequency synchronization (THRESHOLD_FREQ) (step 200). More specifically, the HeNB 16 determines whether the SINR of the signal received by the HeNB 16 from any macro eNB 14 is greater than THRESHOLD_FREQ. The threshold for frequency synchronization (THRESHOLD_FREQ) is such that a macro eNB 14 for which the SINR at the HeNB 16 is greater than the threshold will enable frequency synchronization with an acceptable frequency error (e.g., a very low frequency error or a frequency error that is less than a predefined maximum acceptable frequency error).

If there is no macro eNB 14 for which the SINR at the HeNB 16 is greater than the predefined threshold (THRESHOLD_FREQ), the HeNB 16 selects another HeNB 16 (i.e., another small eNB) for both time and frequency synchronization (step 202). In some embodiments, the HeNB 16 selects another HeNB 16 on the same operating frequency (e.g., in the same cluster) having the highest or best SINR. However, SINR is only one criterion that may be used when selecting the best HeNB 16 for synchronization. Additional or alternative criteria may be used.

Conversely, if there is at least one macro eNB 14 for which the SINR at the HeNB 16 is greater than the predefined threshold (THRESHOLD_FREQ) (i.e., if frequency synchronization is possible using signals received from a macro eNB 14), then the HeNB 16 selects a macro eNB 14 for which the SINR at the HeNB 16 is greater than the predefined threshold (THRESHOLD_FREQ) (e.g., the macro eNB 14 having the highest SINR) as the first eNB 14 for frequency synchronization (step 204). If more than one macro eNB 14 has a SINR at the HeNB 16 that is greater than THRESHOLD_FREQ, then, in some embodiments, the HeNB 16 selects the macro eNB 14 having the highest or best SINR as the first eNB 14 for frequency synchronization.

After selecting the macro eNB 14 as the first eNB 14 for frequency synchronization, the HeNB 16 makes a choice regarding the eNB 14, 16 to be used for time synchronization. More specifically, in this example, the HeNB 16 queries a synchronization status of the macro eNB 14 selected for frequency synchronization (step 206). In some embodiments, the HeNB 16 queries the corresponding MME for the synchronization status of the macro eNB 14 using an eNB Configuration Transfer procedure. The synchronization status indicates whether the macro eNB 14 is currently in a synchronous state with respect to the other macro eNBs 14 or whether a time offset between the transmit timing of the macro eNB 14 and a reference timing (e.g., GNSS timing or some reference macro eNB 14 timing) is available/known.

With regard to the eNB Configuration Transfer procedure, the current specifications for HeNBs allow some Self-Organizing Network (SON) functionality where an eNB 14, 16 can request information regarding another eNB 14, 16 via the MME of the corresponding MME/S-GW 18. According to current LTE specifications, it is possible for an eNB 14, 16 to request SON information via an S1 procedure called eNB Configuration Transfer. Specifically, within an eNB Configuration Transfer message from the eNB 14, 16 to the MME of the corresponding MME/S-GW 18, it is possible to indicate a target eNB Identifier (ID) and the SON information that is required from that target eNB 14, 16. In response, the MME of the corresponding MME/S-GW 18 will forward such an information request to the target eNB 14, 16 via a procedure called MME Configuration Transfer. Once the target eNB 14, 16 receives the request, the target eNB 14, 16 will reply via the eNB Configuration Transfer towards the MME of the corresponding MME/S-GW 18. This reply will include the information requested by the source eNB 14, 16. The MME of the corresponding MME/S-GW 18 will forward the information requested to the source eNB 14, 16 by means of a new MME Information Transfer.

If a source eNB 14, 16 requests time synchronization information from a target eNB 14, 16, the reply contained in the SON Configuration Transfer Information Element (IE) from the target eNB 14, 16 to the source eNB 14, 16 includes the following elements:

Stratum level: This is the number of hops between the target eNB 14, 16 and the synchronization source. That is, when the stratum level is M, the target eNB 14, 16 is synchronized to an eNB 14, 16 whose stratum level is M−1, which in turn is synchronized to an eNB 14, 16 with stratum level M−2 and so on. The eNB 14, 16 with stratum level 0 is the synchronization source.

Synchronization status: This is a flag that indicates whether an eNB 14, 16 is currently in a synchronous or asynchronous state.

After obtaining the synchronization status of the macro eNB 14, the HeNB 16 then determines whether the macro eNB 14: (1) has a SINR at the HeNB 16 that is greater than a predefined threshold for time synchronization (THRESHOLD_TIME) and (2) either (a) is synchronized or (b) has available offset information (step 208). The predefined threshold for time synchronization (THRESHOLD_TIME) is a threshold above which a very low time synchronization error is guaranteed. Specifically, the predefined threshold for time synchronization (THRESHOLD_TIME) is such that, if the SINR of the macro eNB 14 is greater than THRESHOLD_TIME, then time synchronization using the signals transmitted by the macro eNB 14 will have very low synchronization error (e.g., less than some predefined maximum acceptable time synchronization error). For time synchronization, the small cell prioritizes using an eNB that will yield the lowest likely synchronization error in comparison to its closest neighboring cells. For example, when multiple eNBs have SINRs that are greater than the threshold, the eNB with the highest SINR is chosen. Another example, is when an eNB with a lower stratum number has a worse SINR than an eNB with a higher stratum number. In this situation, the target eNB estimates the increase in error due to a greater stratum number and compares it to the estimated reduction in error due to the higher SINR and determines which source eNB would be better to use for synchronization.

If the macro eNB 14 has sufficient SINR and is synchronized or its offset is available, then the macro eNB 14 is selected as the second eNB 14 for time synchronization (step 210). Otherwise, the HeNB 16 selects another HeNB 16 (i.e., another small eNB) for time synchronization (step 212). In this case, the other HeNB 16 selected for time synchronization is the best HeNB 16 on the current operating frequency of the HeNB 16 being synchronized. The best HeNB 16 (or in other words the best small cell) for time synchronization may be, for example, the HeNB 16 (or in other words the small cell) with the highest SINR at the HeNB 16 being synchronized.

FIGS. 6A and 6B illustrate step 102 of FIG. 4 in more detail according to some other embodiments of the present disclosure. As discussed above, for these embodiments, the HeNB 16 performing synchronization is able to distinguish the macro cell eNBs 14 from other HeNBs 16. This embodiment is similar to that of FIG. 5 but where the HeNB 16 (i.e., the small cell eNB) may select another HeNB 16 (i.e., another small cell) for time synchronization even when a macro cell is received with SINR greater than the predetermined threshold. This is done when the received SINR from the small cell is significantly greater than the SINR for the macro cell.

In this embodiment, steps 300-310 are the same as steps 200-208 and 212 of FIG. 5 and, as such, the details are not repeated. In the process of FIGS. 6A and 6B, if the macro eNB 14 has sufficient SINR and is synchronized or its offset to some reference synchronization time is known, then the macro eNB 14 determines whether the best HeNB 16 SINR minus the best macro eNB 14 SINR is greater than a predefined threshold (THRESH_SMALL) (step 312). The predefined threshold (THRESH_SMALL) is selected such that, if this threshold is exceeded, then time synchronization to the HeNB 16 having the best SINR would be better than (e.g., have less error than) time synchronization to the best eNB 14. If so, the HeNB 16 selects another HeNB 16 (i.e., another small eNB) for time synchronization (step 314). In this case, the other HeNB 16 selected for time synchronization is the best HeNB 16 on the current operating frequency of the HeNB 16 being synchronized. The best HeNB 16 (or in other words the best small cell) for time synchronization may be, for example, the HeNB 16 (or in other words the small cell) with the highest SINR at the HeNB 16 being synchronized. Otherwise, the HeNB 16 selects the macro eNB 14 having the best SINR as the second eNB 14 for time synchronization (step 316).

FIG. 7 illustrates step 102 of FIG. 4 in more detail according to some embodiments of the present disclosure. Here, the HeNB 16 performing synchronization is not able to easily distinguish (or does not need to distinguish) the macro eNBs 14 from other HeNBs 16. In other words, the small cell cannot easily distinguish, from the received reference signals, whether the received reference signals are from a macro cell or a small cell. In this case, the small cell selects the eNB 14, 16 (i.e., a macro eNB 14 or a HeNB 16) with the highest SINR as the first eNB 14, 16 for frequency synchronization (step 400). For time synchronization, the HeNB 16 queries the synchronization information of the top few eNBs 14, 16 with the best received SINR (step 402). More specifically, in this example, the HeNB 16 queries the synchronization information of the eNBs 14, 16 with the N best SINRs, where N is greater than or equal to 2. The HeNB 16 may query the synchronization information of the eNBs 14, 16 having the N best SINRs by querying the corresponding MME using, for example, an eNB Configuration Transfer procedure. In this example, the synchronization information of the eNBs 14, 16 includes the synchronization status of the eNBs 14, 16 and the stratum numbers/levels of the eNBs 14, 16 (i.e., the number of hops between the eNBs 14, 16 and the synchronization source).

For time synchronization, the HeNB 16 selects the eNB 14, 16 that is synchronized or has an available offset from a reference timing that is expected to have the lowest time synchronization error based on the SINRs of the eNBs 14, 16 having the N best SINRs and their stratum numbers/levels (step 404). Note that the HeNB 16 knows whether an eNB 14, 16 has an available offset by, for example, results returned when querying for synchronization information. As an example, an eNB 14, 16 with a lower SINR but with a lower stratum number may be chosen depending on which eNB 14, 16 is likely to yield a lower total time synchronization error value. The variance of the estimates for different stratum numbers may be used to estimate the quality of the synchronization estimates for each stratum number at different SINRs. This information can be used to compare the expected quality of measurements between eNBs with different stratum numbers and different SINRs at the synchronizing eNB. The time synchronization derived from the selected eNB 14, 16 may either be directly applied or it may be applied together with a time offset.

In the embodiments above, the HeNB 16 performing synchronization independently selects the eNBs 14, 16 for time and frequency synchronization. With respect to time synchronization, the HeNB 16 desires to synchronize its timing to a reference timing source (e.g., a reference macro eNB 14 or GNSS). However, in some situations, the HeNB 16 may not have access to the reference timing source. For example, in the embodiments above, the macro eNB 14-1 (as an example) may be selected by the HeNB 16 as the first eNB 14 to be used by the HeNB 16 for time synchronization. However, there may be an offset between the transmit timing of the macro eNB 14 and a reference timing source (e.g., the transmit timing of another macro eNB 14 or GNSS). In this case, in order for the HeNB 16 to synchronize to the reference timing source, it is desirable to know the offset between the macro eNB 14-1 and the reference timing source.

Figure 8:
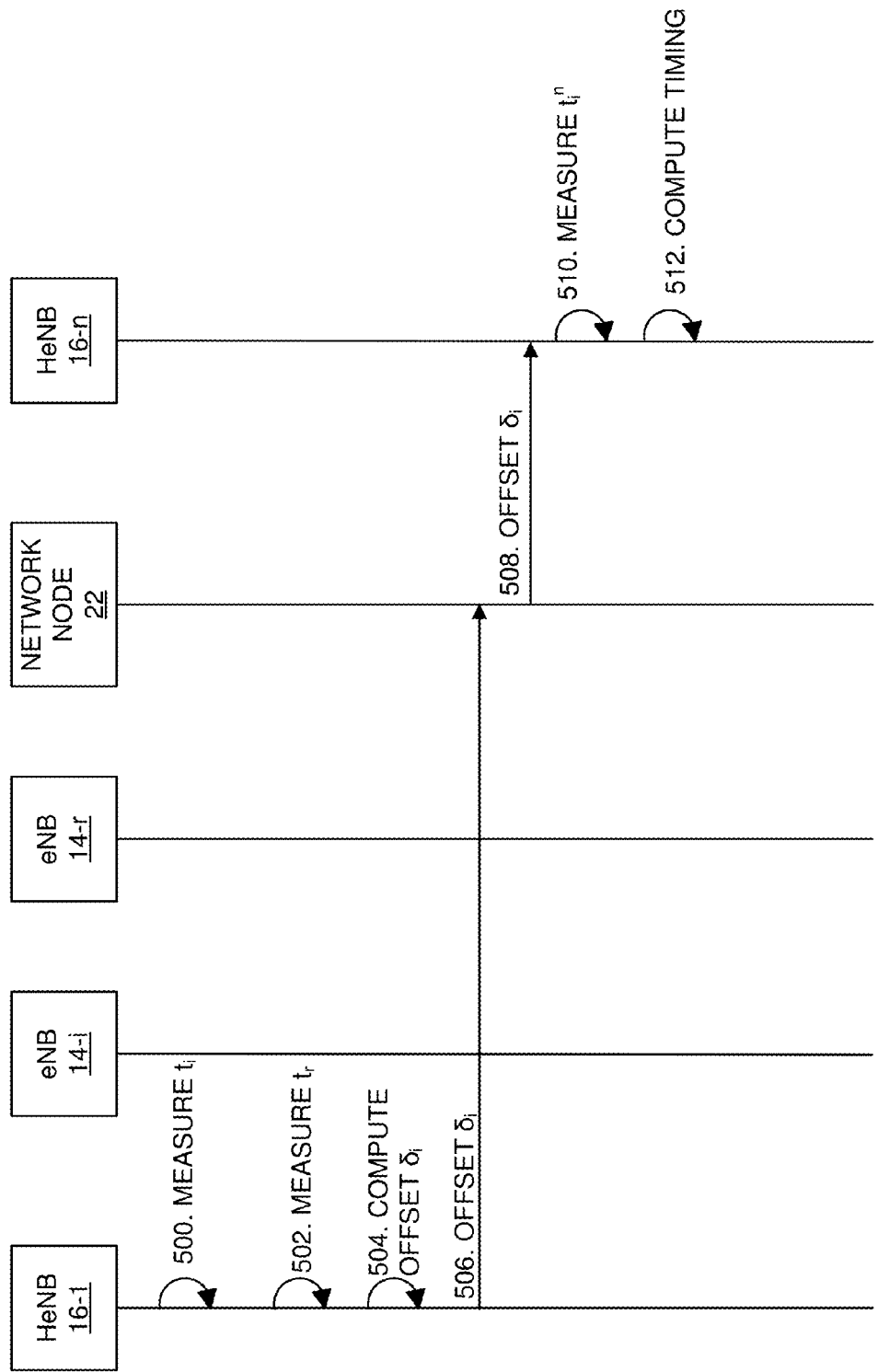
FIG. 8 illustrates a process by which a time offset for a transmit timing of a macro enhanced, or evolved, Node B (eNB) is measured by a HeNB, reported to a network node, and utilized by another HeNB to obtain time synchronization according to some embodiments of the present disclosure.
Figure 9:
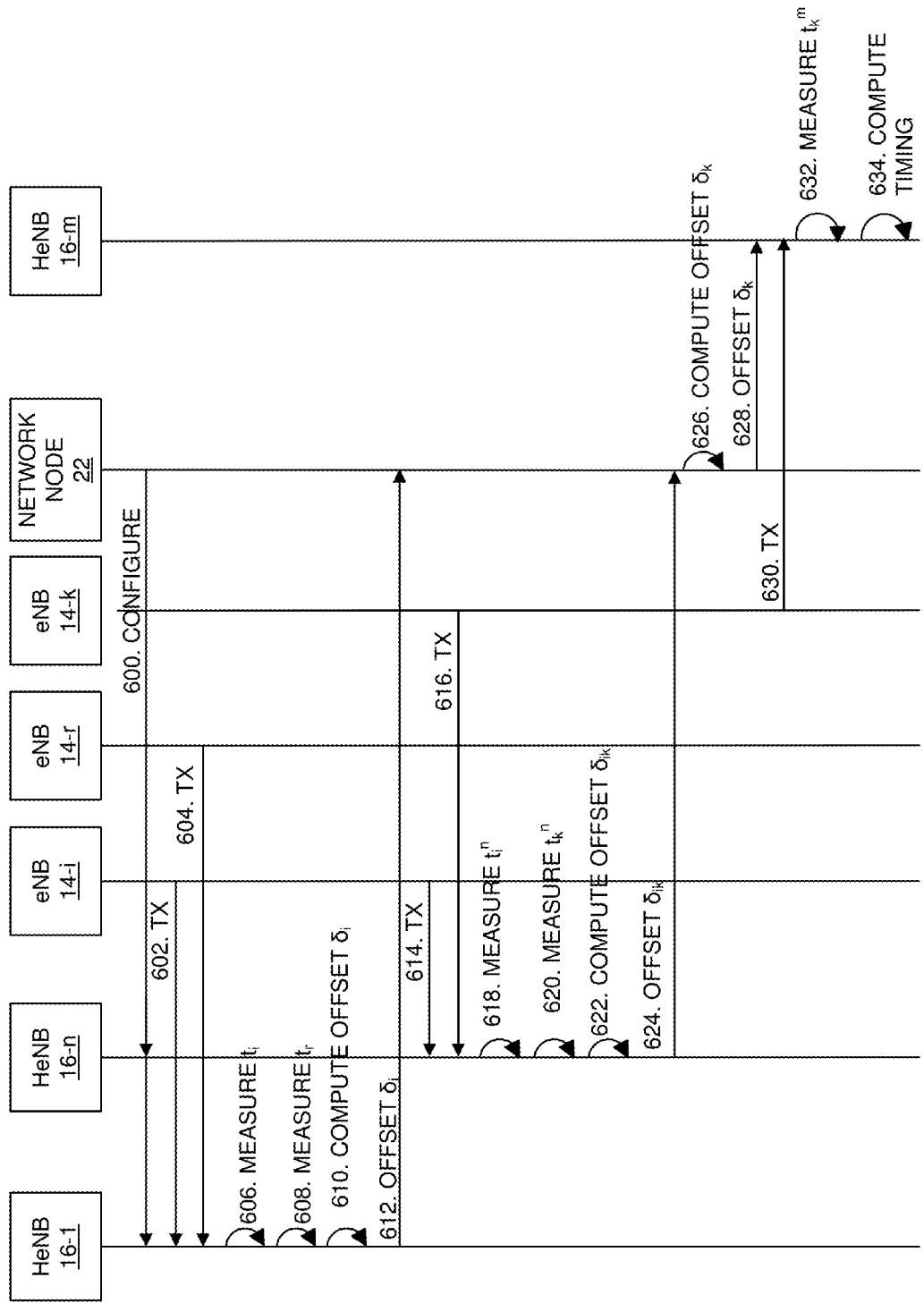
FIG. 9 illustrates a process for computing a time offset for a transmit timing of a macro node that is not directly measureable by any HeNB according to some embodiments of the present disclosure.

FIGS. 8 and 9 relate to embodiments in which a measurement, by a first small cell, of a time offset between the transmit timing of a first macro cell (which is a reference macro cell) and the transmit timing of a second macro cell can be used to allow a second small cell to use the second macro cell to perform time synchronization to the reference timing. The second small cell can measure the transmit timing of the second macro cell and then apply the time offset measured by the first small cell to synchronize to the timing of the first macro cell. Propagation delays can also be accounted for if the locations of all of the cells are known.

As an illustrative example, a small cell eNB may measure a received timing difference of $\delta_i$ between the received frame timing of eNB i (typically a macro cell) and another reference eNB, eNB r, whose timing along with some fixed offset is used as a reference timing for synchronization. That is, $$\delta_i = t_i - t_R$$

where $t_i$ the received timing for the eNB at the small cell eNB, $t_R$ is the reference timing derived from a reference macro eNB, eNB r, and a constant fixed time offset $\Delta$ so that $$t_R = t_r + \Delta.$$

This time difference is adjusted to remove the effect of the propagation delays between the small cell and eNB i and eNB r using knowledge of the locations of both eNBs. This adjustment is trivial for those skilled in the art and is therefore not included in the above equation and following description, for ease of explanation. This time difference is then made available to another small cell eNB that is also able to receive signals from eNB i but not from the reference eNB, eNB r. This small cell, say eNB n, then measures the receive frame timing of the eNB i and uses it to align its transmit timing along with the offset, $\delta_i$, that has been signaled to it. Specifically, eNB n may measure receive timing of eNB i (adjusted for propagation delay between eNB i and eNB n) and use knowledge of the timing offset, $\delta_i$, for eNB i to align the transmit timing for the small cell as follows:

$$t_T^n = t_i^n - \delta_i,$$

where $t_T^n \approx t_R$ is the transmit timing that should be used by the nth small cell eNB. It should be noted that the common synchronization reference timing achieved for the small cell using the above method may be different from that of any macro cell and this is characterized by the fixed constant $\Delta$. This outcome is fine when the macro cells and the small cells are on separate frequencies. When they are on the same frequency, the reference time, $t_R$, may be chosen to align with one of the macro cells, i.e., $\Delta$ may be chosen to align with the propagation delay between a macro eNB and the cluster of small cells.

This process is illustrated in FIG. 8. While this example refers to the HeNB 16-1, it is applicable to any type of small cell eNB. In the illustrated example, the HeNB 16-1 measures the transmit timing $t_i$ an i-th macro eNB 14-i (step 500). In addition, the HeNB 16-1 measures the transmit timing $t_r$ of a reference macro eNB 14-r (step 502). The HeNB 16-1 then computes an offset $\delta_i$ between the transmit timing $t_i$ the macro eNB 14-i and the reference timing $t_R$ based on the transmit timing $t_r$ of the reference eNB 14-r and a known value of $\Delta$ (step 504) and sends the offset $\delta_i$ to a network node 22 (step 506). The network node 22 may be any suitable node in the LTE network 10 such as, for example, the HeNB GW 20. Note that, in some alternative embodiments, the HeNB 16-1 is not aware of $\Delta$ and, as such, may compute and report the value of $t_i - t_r$, where the value of $\Delta$ can then be applied by the network node 22 to obtain the offset $\delta_i$. The network node 22 provides the offset $\delta_i$ to other HeNBs 16 in the same cluster including the HeNB 16-n (step 508).

In this example, the HeNB 16-n is able to receive signals from the i-th macro eNB 14-i but is unable to receive signals from the reference macro eNB 14-r. Nevertheless, the HeNB 16-n is able to synchronize to the reference timing $t_R$ using the transmit timing of the i-th macro eNB 14-i as measured by the HeNB 16-n and the offset $\delta_i$. Specifically, the HeNB 16-n measures the transmit timing $t_i^n$ of the i-th macro eNB 14-i (step 510) and computes the transmit timing $t_T^n$ of the HeNB 16-n needed for time synchronization to the reference timing $t_R$ as a function of $t_i^n$ and $\delta_i$ (step 512). Specifically, in some embodiments, the HeNB 16-n computes the transmit timing $t_T^n$ of the HeNB 16-n needed for time synchronization to the reference timing $t_R$ as $t_T^n = t_i^n - \delta_i$.

The embodiment of FIG. 8 utilizes a direct measurement of the offset $\delta_i$ to enable time synchronization of the HeNB 16-n. However, there may be implementations in which there is a macro eNB 14 (referred to as macro eNB 14-k) for which a direct measurement of the offset $\delta_k$ between the transmit timing of the macro eNB 14-k and the reference timing is not possible or, for some reason, is impracticable or unavailable. This occurs when, for example, there is no HeNB 16 in the LTE network 10 that can receive signals from both the macro eNB 14-*k* and the reference eNB 14-*r*. In this case, the offset $\delta_k$ is not directly measureable and any small cell(s) that can only receive signals from the macro eNB 14-*k* may not be able to be synchronized to the reference timing $t_R$.

In order to address this problem, in some embodiments, another HeNB 16 (or in other words another small cell) that cannot receive signals from the reference eNB 14-*r* but can receive signals from both macro eNB 14-*k* and the macro eNB 14-*i* is used to generate the appropriate offset corresponding to the macro eNB 14-*k*. To explain this, consider that the HeNB 16-*n* that is able to receive transmissions from the macro eNB 14-*i* is also able to receive signals from the macro eNB 14-*k*. In some embodiments, measurements from the HeNB 16-*n* (adjusted for propagation delay based on knowledge of the eNB locations) are then used to generate the offset for the macro eNB 14-*k*. Specifically, the HeNB 16-*n* measures:

$$\delta_{ik} = t_k^n - t_i^n,$$

where $\delta_{ik}$ is the difference in the transmit timing $t_k^n$ of the macro eNB 14-*k* as measured at the HeNB 16-*n* and the transmit timing $t_i^n$ of the macro eNB 14-*i* as measured at the HeNB 16-*n*. This offset is then signaled to a node in the LTE network 10 (e.g., the network node 22) which has previously received, from another HeNB 16, the offset $\delta_i$ corresponding to the offset between the transmit timing of the macro eNB 14-*i* and the reference timing $t_R$, where again the reference timing $t_R$ is equal to the transmit timing $t_r$ of the reference macro eNB 14-*r* plus $\Delta$. The network node 22 then generates the offset $\delta_k$ for the macro eNB 14-*k*, with respect to the reference transmit timing $t_R$, as:

$$\delta_k = \delta_{ik} + \delta_i,$$

which yields the correct offset $\delta_k = t_k - t_R$. This offset $\delta_k$ can then be signaled to a HeNB 16 that can only receive signals from the macro eNB 14-*k* so that the HeNB 16 can synchronize the transmit timing of the corresponding small cell to the reference timing $t_R$.

This embodiment is illustrated in FIG. 9. Again, while this example refers to the HeNBs 16, it is applicable to any type of small cell eNBs. As illustrated, the network node 22 configures the HeNBs 16-1 and 16-*n* (step 600). While not illustrated, the network node 22 may configure all or any subset of the HeNBs 16. In some embodiments, the network node 22 configures the offsets measured and reported by the HeNBs 16. For example, in some embodiments, the network node 22 may configure or direct the HeNBs 16 to report measurements periodically with the periodicity determined by drift rates of oscillators in the eNBs 14 and/or 16 in the LTE network 10. In particular, in some embodiments, the periodicity is determined by the drift rates of the oscillators in the source eNBs, which for the macro/small cell example are the macro eNBs 14. This may be beneficial in order to enable the network node 22 to actively manage the maintenance of offset information in such a manner as to ensure that the offsets being provided are not outdated and inaccurate due to clock drifts at each of the eNBs 14 and/or 16. In other embodiments, the network node 22 configures the HeNBs 16 (or the HeNBs 16 may otherwise be configured to) report offset measurements for only the pair of macro eNBs 14 whose signals are received with the highest two SINRs. In other embodiments, the HeNBs 16 may be configured to report offsets for all macro eNBs 14 that are received above a certain predefined SINR threshold. Note, however, that step 600 is optional. For instance, rather than being configured by the network node 22, the offset measurements and reporting may be predetermined or signaled by the LTE network 10.

The macro eNBs 14-*i* and 14-*r* transmit signals (step 602 and 604). These signals include any suitable signals that can be used by the HeNBs 16 to measure the transmit timing of the macro eNBs 14-*i* and 14-*r*. In this example, the HeNB 16-1 measures the transmit timing $t_i$ the macro eNB 14-*i* as well as the transmit timing $t_r$ of the reference macro eNB 14-*r* (steps 606 and 608). The HeNB 16-1 then computes the offset $\delta_i$ between the transmit timing $t_i$ the macro eNB 14-*i* and the transmit timing $t_r$ of the reference macro eNB 14-*r* (step 610). The HeNB 16-1 reports the offset $\delta_i$ to the network node 22 (step 612). Note that, in some alternative embodiments, the HeNB 16-1 is not aware of $\Delta$ and, as such, may compute and report the value of $t_i - t_r$, where the value of $\Delta$ can then be applied by the network node 22 to obtain the offset $\delta_i$.

In addition, the macro eNBs 14-*i* and 14-*k* transmit signals that are received by the HeNB 16-*n* (steps 614 and 616). The signal(s) transmitted in step 614 may be the same as that of step 602. The HeNB 16-*n* measures the transmit timing $t_i^n$ of the macro eNB 14-*i* as well as the transmit timing $t_k^n$ of the macro eNB 14-*k* (steps 618 and 620). The HeNB 16-*n* then computes the offset $\delta_{ik}$ between the transmit timing $t_i^n$ of the macro eNB 14-*i* and the transmit timing $t_k^n$ of the macro eNB 14-*k* (step 622). The HeNB 16-*n* reports the offset $\delta_{ik}$ to the network node 22 (step 624).

The network node 22 then computes the offset $\delta_k$ between the macro eNB 14-*k* and the reference timing $t_R$ as a function of $\delta_{ik}$ and $\delta_i$ (step 626). Specifically, the network node 22 computes the offset $\delta_k$ between the macro eNB 14-*k* and the reference timing $t_R$ as $\delta_k = \delta_{ik} + \delta_i$. The network node 22 sends the offset $\delta_k$ to the other HeNBs 16, and in particular the HeNB 16-*m* (step 628). The offset $\delta_k$ may be provided to the HeNB 16-*m* (as well as the other HeNBs 16) as part of a list of macro eNBs 14 and corresponding offset values. Notably, the offset values may be, in some embodiments, average offset values per macro eNB 14. While not illustrated, steps 602-624 may also be performed for other macro eNBs 14 and pairs of macro eNBs 14. In this manner, the HeNBs 16 may report offsets for the different macro eNBs 14 as well as the different pairs of macro eNBs 14.

Thereafter, using a signal transmitted by the macro eNB 14-*k* (step 630), the HeNB 16-*m* is able to synchronize its transmit timing to the reference timing $t_R$. Specifically, the HeNB 16-*m* measures the transmit timing $t_k^m$ of the macro eNB 14-*k* (step 632) and computes the transmit timing $t_T^m$ for the HeNB 16-*m* based on the measured transmit timing $t_k^m$ and the offset $\delta_k$ (step 634). Specifically, in some embodiments, the HeNB 16-*m* computes the transmit timing $t_T^m$ for the HeNB 16-*m* as $t_T^m = t_k^m - \delta_k$.

In some embodiments, the network node 22 applies propagation delay corrections to the reported measurements. Furthermore, the network node 22 may also choose to average timing offsets between pairs of macro cells that are reported by multiple small cells in order to obtain more accurate timing differences.

In some embodiments, the process of FIGS. 8 and/or 9 may be utilized by, e.g., the network node 22 to create a graph where nodes are eNBs (i.e., any eNBs that belong to the source eNBs (e.g., the set of macro eNBs)) and any two nodes are connected if there is a small cell that has reported the timing offset between the pair of eNBs. In some embodiments, this graph is then used to find the shortest path between any eNB and the eNB providing the reference timing so as to minimize the cumulative effect of offset estimation errors.

Figure 10:
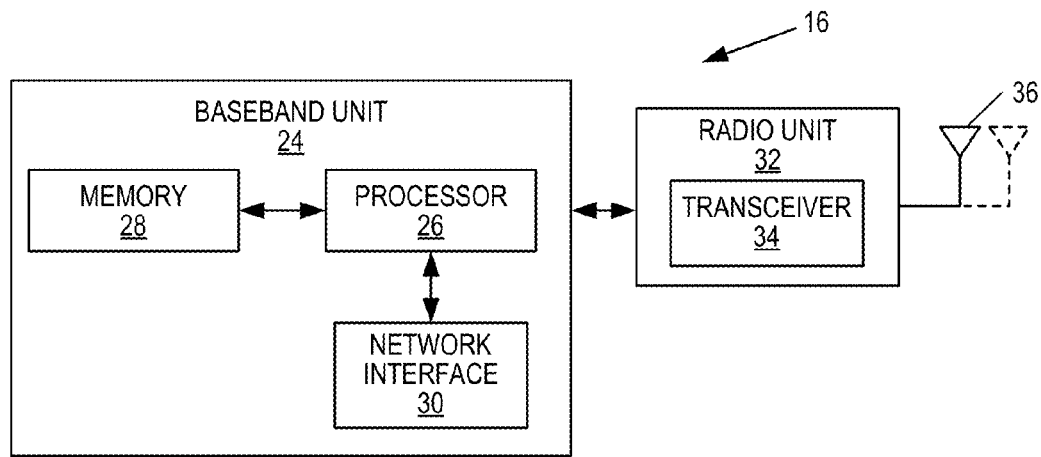
FIG. 10 is a block diagram of a HeNB according to some embodiments of the present disclosure.

FIG. 10 is a block diagram of one of the HeNBs 16 according to some embodiments of the present disclosure. Note that the HeNB 16 may be more generally referred to herein as a small cell base station. As illustrated, the HeNB 16 includes a baseband unit 24 including at least one processor 26 (e.g., Central Processing Unit(s) (CPU(s)), Application Specific Integrated Circuit(s) (ASIC(s)), Field-Programmable Gate Array(s) (FPGA(s)), etc.), memory 28, and a network interface 30 as well as a radio unit 32 including at least one transceiver 34 coupled to one or more antennas 36. In some embodiments, the functionality of the HeNB 16 described herein is implemented, at least partially, in software that is stored in, e.g., the memory 28 and is executable by the processor(s) 26.

In one embodiment, a computer program including instructions which, when executed by at least one processor, causes the at least one processor to carry out the functionality of the HeNB 16 according to any one of the embodiments described herein is provided. In one embodiment, a carrier containing the aforementioned computer program product is provided. The carrier is one of an electronic signal, an optical signal, a radio signal, or a computer readable storage medium (e.g., a non-transitory computer readable medium such as the memory 28).

Figure 11:
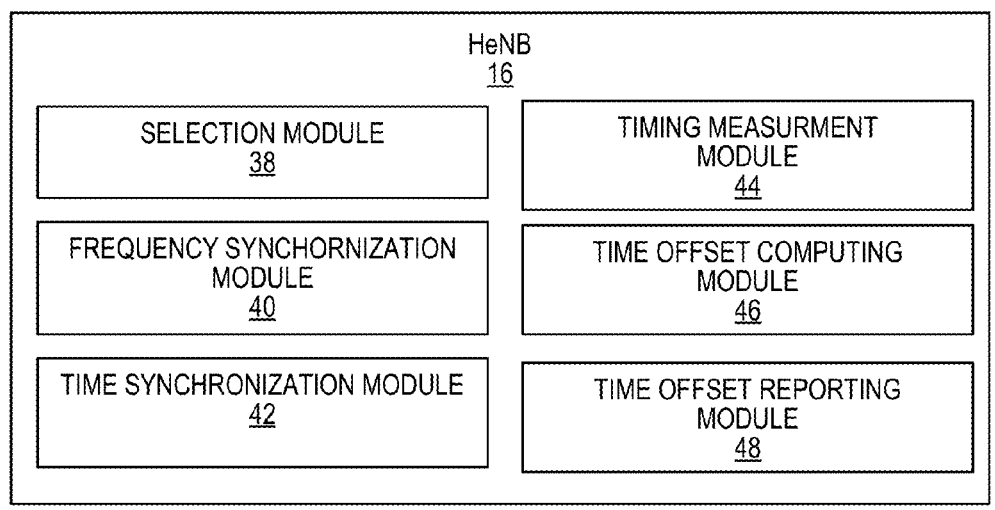
FIG. 11 is a block diagram of a HeNB according to other embodiments of the present disclosure.

FIG. 11 illustrates the HeNB 16 according to other embodiments of the present disclosure. As illustrated, the HeNB 16 includes a selection module 38, a frequency synchronization module 40, a time synchronization module 42, a timing measurement module 44, a time offset computing module 46, and a time offset reporting module 48, each of which is implemented in software. Note that the HeNB 16 is not required to include all of the modules 38 through 48 in all embodiments. The selection module 38 operates to select a first eNB for frequency synchronization and a second eNB for time synchronization, as described above. The frequency and time synchronization modules 40 and 42 perform frequency and time synchronization using the first and second eNBs selected for frequency and time synchronization, respectively.

The timing measurement module 44 operates to measure the transmit timing of macro eNBs 14, as described above. The time offset computing module 46 computes the time offsets between the transmit timing of one macro eNB 14 and either the transmit timing of another macro eNB 14 or a reference timing, as described above. The time offset reporting module 48 operates to report the time offset(s) computed by the time offset computing module 46 to, e.g., the network node 22, as also described above.

Figure 12:
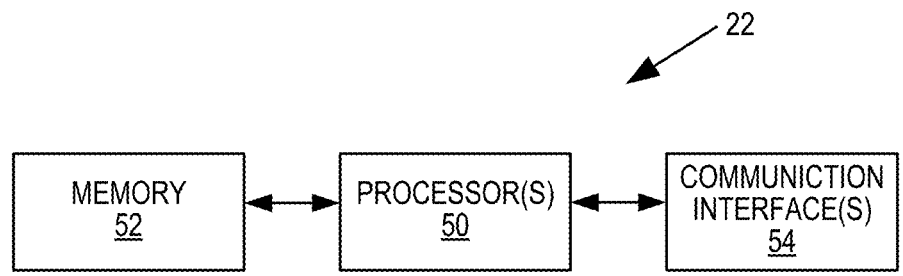
FIG. 12 is a block diagram of the network node of FIGS. 8 and 9 according to some embodiments of the present disclosure.

FIG. 12 is a block diagram of the network node 22 according to some embodiments of the present disclosure. As illustrated, the network node 22 includes at least one processor 50 (e.g., CPU(s), ASIC(s), FPGA(s), etc.), memory 52, and at least one communication interface 54 (e.g., an Ethernet interface). In some embodiments, the functionality of the network node 22 is at least partially implemented in software that is stored in the memory 52 and executable by the processor(s) 50.

In one embodiment, a computer program including instructions which, when executed by at least one processor, causes the at least one processor to carry out the functionality of the network node 22 according to any one of the embodiments described herein is provided. In one embodiment, a carrier containing the aforementioned computer program product is provided. The carrier is one of an electronic signal, an optical signal, a radio signal, or a computer readable storage medium (e.g., a non-transitory computer readable medium such as the memory 52).

Figure 13:
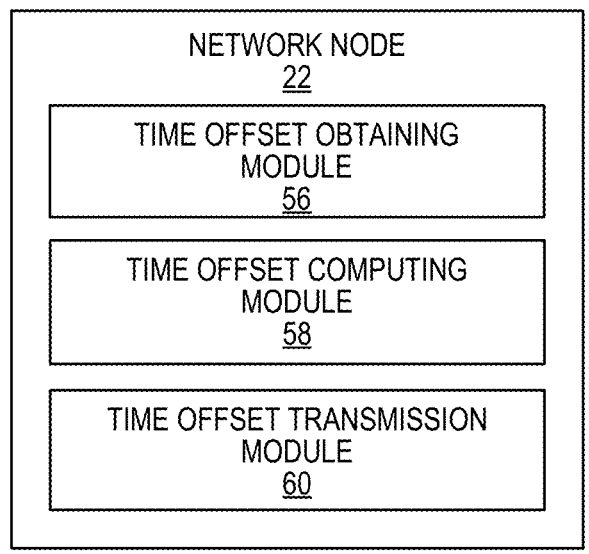
FIG. 13 is a block diagram of the network node of FIGS. 8 and 9 according to other embodiments of the present disclosure.

FIG. 13 is a block diagram of the network node 22 according to some other embodiments of the present disclosure. As illustrated, the network node 22 includes a time offset obtaining module 56, a time offset computing module 58, and a time offset transmission module 60, each of which is implemented in software. The time offset obtaining module 56 receives (e.g., via an associated communication interface of the network node 22) time offsets from, e.g., the HeNBs 16, as described above. The time offset computing module 58 may only be included in some embodiments and operates to compute the offsets for any macro eNBs 14 that cannot be directly measured by the HeNBs 16 based on offsets reported by the HeNBs 16, as also described above. The time offset transmission module 60 operates to transmit the offsets to the HeNBs 16 (e.g., via an associated communication interface of the network node 22).

The following acronyms are used throughout this disclosure.

3GPP Third Generation Partnership Project
ASIC Application Specific Integrated Circuit
CPU Central Processing Unit
CRS Common Reference Symbol
dB Decibel
dBm Decibel-Milliwatt
E-UTRAN Evolved Universal Terrestrial Radio Access Network
eNB Enhanced or Evolved Node B
FPGA Field-Programmable Gate Array
GNSS Global Navigation Satellite System
GPS Global Positioning System
GW Gateway
HeNB Home Enhanced or Evolved Node B
ID Identifier
IE Information Element
LTE Long Term Evolution
MME Mobility Management Entity
ms Millisecond
OFDM Orthogonal Frequency Division Multiplexing
RB Resource Block
RE Resource Element
RS Reference Symbol
S-GW Serving Gateway
SINR Signal-to-Interference plus Noise Ratio
SON Self-Organizing Network
UE User Equipment Those skilled in the art will recognize improvements and modifications to the embodiments of the present disclosure. All such improvements and modifications are considered within the scope of the concepts disclosed herein and the claims that follow.

What is claimed is:

1. A method of operation of synchronizing base station to obtain frequency and time synchronization in a cellular network, comprising:
    selecting a first base station for frequency synchronization and a second base station for time synchronization;
    performing frequency synchronization with the first base station using a signal transmitted from a radio interface of the first base station; and
    performing time synchronization with the second base station using a signal transmitted from a radio interface of the second base station.

2. The method of claim 1 wherein the cellular network comprises a first layer comprising a plurality of first layer base stations and a second layer comprising a plurality of second layer base stations, the first base station is in either the plurality of first layer base stations or the plurality of second layer base stations, the second base station is in either the plurality of first layer base stations or the plurality of second layer base stations, and the synchronizing base station is in the plurality of second layer base stations.

3. The method of claim 2 wherein selecting the first base station for frequency synchronization and the second base station for time synchronization comprises:
   determining whether a first layer base station having a received signal quality at the synchronizing base station that is greater than a first threshold is available in the plurality of first layer base stations;
   if a first layer base station having a received signal quality at the synchronizing base station that is greater than the first predefined threshold is available in the plurality of first layer base stations, selecting the first layer base station as the first base station for frequency synchronization;
   if a first layer base station having a received signal quality at the synchronizing base station that is greater than the first threshold is not available in the plurality of first layer base stations, selecting another second layer base station in the plurality of second layer base stations as both the first base station for frequency synchronization and the second base station for time synchronization.

4. The method of claim 3 wherein if a first layer base station having a received signal quality at the synchronizing base station that is greater than the first threshold is available in the plurality of first layer base stations, selecting the first base station for frequency synchronization and the second base station for time synchronization further comprises:
   obtaining a synchronization status of the first layer base station, the synchronization status being indicative of whether the first layer base station is synchronized in time with other first layer base stations in the plurality of first layer base stations;
   determining whether: (a) the received signal quality for the first layer base station at the synchronizing base station is greater than a second predefined threshold that is greater than the first predefined threshold and (b) either the first layer base station is synchronized with other first layer base stations as indicated by the synchronization status of the first layer base station or time offset information for the first layer base station is available, where the time offset information is indicative of a time offset between transmit timing of the first layer base station and a reference timing;
   selecting the first layer base station as the second base station for time synchronization if the received signal quality for the first layer base station at the synchronizing base station is greater than the second predefined threshold and either the first layer base station is synchronized with other first layer base stations or time offset information for the first layer base station is available; and
   otherwise, selecting another second layer base station as the second base station for time synchronization.

5. The method of claim 3 wherein if a first layer base station having a received signal quality at the synchronizing base station that is greater than the first threshold is available, selecting the first base station for frequency synchronization and the second base station for time synchronization further comprises:
   obtaining a synchronization status of the first layer base station, the synchronization status being indicative of whether the first layer base station is synchronized with other first layer base stations;
   determining whether: (a) the received signal quality for the first layer base station at the synchronizing base station is greater than a second predefined threshold that is greater than the first predefined threshold and (b) either the first layer base station is synchronized with other first layer base stations as indicated by the synchronization status of the first layer base station or time offset information for the first layer base station is available, where the time offset information is indicative of a time offset between transmit timing of the first layer base station and a reference timing;
   selecting another second layer base station as the second base station for time synchronization if the received signal quality for the first layer base station at the synchronizing base station is not greater than the second predefined threshold or the first layer base station is not synchronized with other first layer base stations and time offset information for the first layer base station is not available; and
   otherwise:
      determining whether a difference between (a) a received signal quality at the synchronizing base station for another second layer base station having a best received signal quality at the synchronizing base station and (b) a received signal quality level at the synchronizing base station for the first layer base station is greater than a predefined difference threshold;
      if the difference is greater than the predefined difference threshold, selecting the other second layer base station as the second base station for time synchronization; and
      if the difference is not greater than the predefined difference threshold, selecting the first layer base station as the second base station for time synchronization.

6. The method of claim 2 wherein selecting the first base station for frequency synchronization and the second base station for time synchronization comprises:
   selecting a base station with a best received signal quality at the synchronizing base station from among the plurality of first layer base stations and the plurality of second layer base stations as the first base station for frequency synchronization;
   obtaining a synchronization status of each of a plurality of base stations having the N best received signal qualities at the synchronizing base station from among the plurality of first layer base stations and the plurality of second layer base stations, where N>1; and
   selecting one of the plurality of base stations having the N best received signal qualities at the synchronizing base station as the second base station for time synchronization based on the synchronization statuses of the plurality of base stations having the N best received signal qualities at the synchronizing base station.

7. The method of claim 6 wherein selecting the one of the plurality of base stations having the N best received signal qualities at the synchronizing base station for time synchronization comprises selecting a base station having a lowest expected timing error from among those of the plurality of base stations having the N best received signal qualities at the synchronizing base station that are either synchronized or have available time offsets relative to a reference timing.

8. The method of claim 7 wherein an expected timing error for each base station of the plurality of base stations having the N best received signal qualities at the synchronizing base station is determined based on the received signal quality at the synchronizing base station for the base station and a stratum number that defines a number of hops between the base station and a reference base station.

9. The method of claim 2 wherein performing time synchronization using the signal transmitted from the radio interface of the second base station comprises:
   obtaining a timing offset, $\delta_i$, for the second base station with respect to a reference timing;
   measuring a timing of the second base station to provide a timing, $t_i$, of the second base station measured at the synchronizing base station; and
   computing a timing of the synchronizing base station based on the timing, $t_i$, of the second base station measured at the synchronizing base station and the timing offset, $\delta_i$, for the second base station with respect to the reference timing.

10. A synchronizing base station comprising:
   a radio unit;
   at least one processor; and
   memory containing software executable by the at least one processor whereby the synchronizing base station is configured to:
   select a first base station for frequency synchronization and a second base station for time synchronization;
   perform frequency synchronization with the first base station using a signal transmitted from a radio interface of the first base station; and
   perform time synchronization with the second base station using a signal transmitted from a radio interface of the second base station.

* * * * *